(12) United States Patent
Price

(10) Patent No.: US 6,459,239 B1
(45) Date of Patent: Oct. 1, 2002

(54) METHOD AND APPARATUS FOR RECHARGING BATTERIES IN THE PRESENCE OF A LOAD CURRENT

(75) Inventor: David L. Price, Coopersburg, PA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/999,579

(22) Filed: Oct. 31, 2001

(51) Int. Cl.⁷ .............................................. H01M 10/46
(52) U.S. Cl. ....................................... 320/130; 320/141
(58) Field of Search ................................ 320/127, 128, 320/137, 139, 130, 141, 145, 135

(56) References Cited

U.S. PATENT DOCUMENTS

| | | | |
|---|---|---|---|
| 5,600,226 A | * | 2/1997 | Falcon |
| 5,898,294 A | * | 4/1999 | Gold |
| 6,154,011 A | * | 11/2000 | Lam et al. |
| 6,307,352 B1 | * | 10/2001 | Hooper |

FOREIGN PATENT DOCUMENTS

GB    9919400.3    8/1999

* cited by examiner

*Primary Examiner*—Edward T. Tso
(74) *Attorney, Agent, or Firm*—Ryan, Mason & Lewis, LLP

(57) ABSTRACT

A method and apparatus are disclosed for recharging a battery in the presence of a load. The present invention utilizes the battery itself as an averaging element to maintain the battery at the desired threshold voltage, $V_T$ (on average) as the current charging source is selectively turned on and off. Generally, the present invention measures the battery voltage at the end of each interval just before the current source is turned on or off. A calculation is performed for each charging cycle (current on and off) to determine the duty cycle for the subsequent cycle. The calculated duty cycle is the percentage of time that the current source should be applied for the next cycle. The calculated duty cycle is based on the difference between the actual battery voltage and the desired voltage. In this manner, the on and off times are modulated by the present invention such that the average battery voltage, $V_{bat}$, is the desired threshold voltage, $V_T$.

27 Claims, 3 Drawing Sheets

METHOD AND APPARATUS FOR RECHARGING BATTERIES IN THE PRESENCE OF A LOAD CURRENT

FIELD OF THE INVENTION

The present invention relates generally to rechargeable batteries, and more particularly, to methods and apparatus for recharging batteries in the presence of a load current.

BACKGROUND OF THE INVENTION

As electronic devices have become increasingly portable, the need for improved batteries has likewise increased. Rechargeable batteries are used in various electronic devices, such as portable audio devices, portable computers, cellular telephones and personal digital assistants (PDAs). A number of different types of rechargeable batteries exist, such as nickel cadmium (NiCd), nickel-metal hydride (NiMH), lithium ion (Li-ion) and lithium-polymer (Li-polymer) batteries.

The popularity of lithium-based rechargeable batteries has increased in recent years, primary due to improved energy densities, cycle life, output voltages and discharge rates, relative to nickel-based batteries. A number of techniques exist for charging lithium-based rechargeable batteries. Lithium-based rechargeable batteries include control circuitry that maintains the voltage and current of each cell within desired ranges during charge and discharge modes.

One conventional technique for charging lithium-based rechargeable batteries is referred to as constant-current/constant-voltage (CC/CV) charging. As shown in FIG. 1, a constant current is applied to a battery until a threshold voltage, $V_T$, is reached, at a time $t_T$. Typically, the threshold voltage for currently available lithium-based rechargeable batteries is 4.1 or 4.2 V per cell. Once the threshold voltage, $V_T$, is reached, a constant voltage mode charges the battery with a constant voltage approximately equal to the threshold voltage, while the current gradually decreases to zero mA.

Another conventional technique for charging lithium-based rechargeable batteries is a pulse charging technique, shown in FIG. 2, where a constant current 210 is initially applied until the battery voltage exceeds the threshold voltage, $V_T$. The current charge is then turned off until the battery voltage falls below the threshold voltage, $V_T$. Thereafter, a series of current pulses 220 are applied. As shown in FIG. 2, the off time associated with each current pulse (the time required for the battery voltage to fall below the threshold voltage), such as the off times $t_{off1}$ and $t_{off2}$, progressively increases as charging progresses.

While these conventional techniques for charging lithium-based batteries perform effectively when there is no load present on the battery, they do not perform as effectively when a load is present on the battery. Typically, a heavy load may be present when a battery is recharging, such as when a cellular telephone is turned on during a recharge mode. The heavy load current required by the telephone causes inaccurate battery voltage measurements that can lead to overcharging and shortened battery life. The effect of the heavy load condition is that the battery voltage measured while the charge current is applied will be less than the threshold voltage, $V_T$. Typically, conventional charging techniques tend to compensate by applying the charge current longer, and potentially overcharging the battery. A need therefore exists for an improved technique for measuring the battery voltage in the presence of a load current.

SUMMARY OF THE INVENTION

Generally, a method and apparatus are disclosed for recharging a battery in the presence of a load. The present invention utilizes the battery itself as an averaging element to maintain the battery at the desired threshold voltage, $V_T$ (on average) as the current charging source is selectively turned on and off. Generally, the present invention measures the battery voltage at the end of each interval just before the current source is turned on or off. A calculation is performed for each charging cycle (current on and off) to determine the duty cycle for the subsequent cycle. The calculated duty cycle is the percentage of time that the current source should be applied for the next cycle. The calculated duty cycle is based on the difference between the actual battery voltage and the desired voltage. In this manner, the on and off times are modulated by the present invention such that the average battery voltage, $V_{bat}$, is the desired threshold voltage, $V_T$.

The present invention applies during the constant voltage mode when recharging a battery, such as a lithium-based battery or another battery employing CC/CV recharging techniques, in the presence of a load. Well-known techniques, such as the pulse charging techniques described above, may be applied for the constant current mode. The present invention requires only two measurements per charging cycle. Thus, the present invention demonstrates reduced power dissipation, relative to conventional techniques, due to fewer required analog-to-digital conversions.

A more complete understanding of the present invention, as well as further features and advantages of the present invention, will be obtained by reference to the following detailed description and drawings.

DETAILED DESCRIPTION

Figure 1:
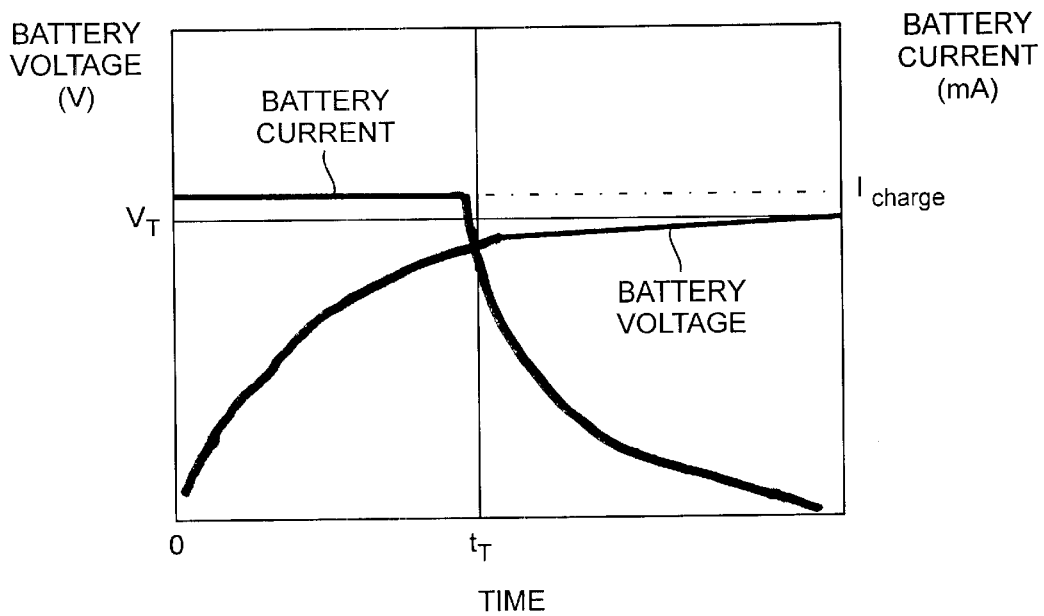
FIG. 1 illustrates a conventional constant current/constant voltage mode charging scheme for recharging a battery.
Figure 2:
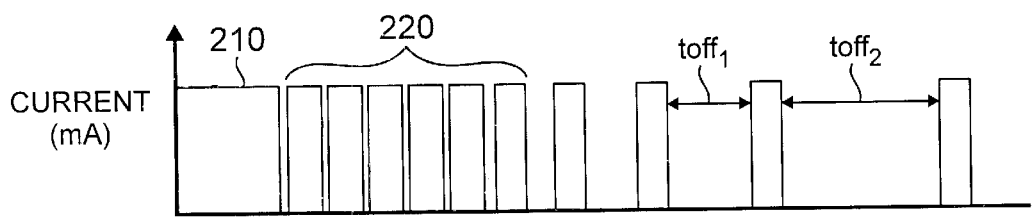
FIG. 2 illustrates a conventional pulse charging scheme for recharging a battery.
Figure 3:
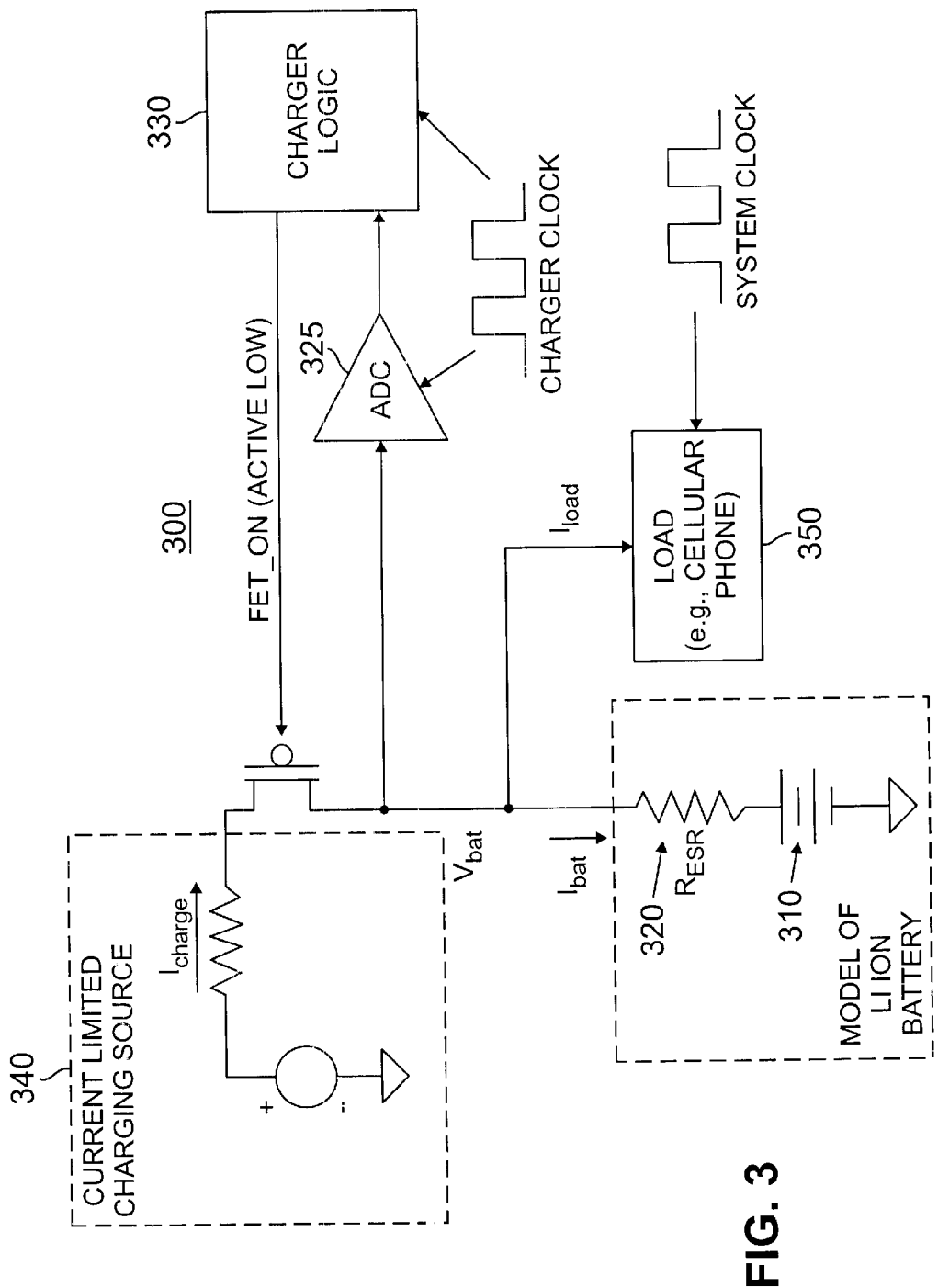
FIG. 3 is a schematic block diagram of a battery charging system that recharges a battery in the presence of a load in accordance with the present invention.

FIG. 3 illustrates a battery charging system 300 for recharging a battery in the presence of a load 350 in accordance with the present invention. As shown in FIG. 3, a lithium-based battery can be modeled as an ideal battery 310 in series with an equivalent series resistance (ESR) 320, in a known manner. The equivalent series resistance 320 is typically on the order of 0.15 to 0.3 ohms. Due to the equivalent series resistance 320, the voltage measured at the battery terminal ($V_{bat}$) will be higher when the charge current is applied than when the charge current is not applied. For a severely discharged battery, a constant current is initially applied until the battery voltage approaches the desired threshold voltage, $V_T$. Thereafter, the battery charging system 300 enters a "top-off" (constant voltage) mode where the battery voltage may exceed the desired threshold voltage, $V_T$, while the charge current is applied, but remain below the desired threshold voltage, $V_T$, when the charge current is off.

Since overcharging can damage the battery, and since undercharging can limit use of the battery, the average battery voltage ($V_{bat}$) must be maintained as close to the desired threshold voltage, $V_T$, as possible. As previously indicated, maintaining the average battery voltage ($V_{bat}$) close to the desired threshold voltage, $V_T$, is challenging when the end product that incorporates the battery, such as a cellular telephone, draws a heavy load current ($I_{load} > I_{charge}$). The effect of the heavy load condition is that the battery voltage measured while the charge current is applied will be less than the desired threshold voltage, $V_T$. Thus, conventional recharging techniques apply the charge current longer than necessary, thereby overcharging the battery.

As shown in FIG. 3, the battery charging system 300 of the present invention includes a charger logic circuit 330 that measures the battery voltage as the battery is charged and selectively applies the charging current from a current source 340 by appropriate application of a control signal, FET_ON. The charging current is applied in a pulsing fashion, where the current source is alternatively turned on and off, such that the average battery voltage is the desired threshold voltage, $V_T$. The battery charging system 300 can be part of a digital signal processor (DSP), microcontroller, microprocessor, application specific integrated circuit (ASIC) or another integrated circuit.

Figure 4:
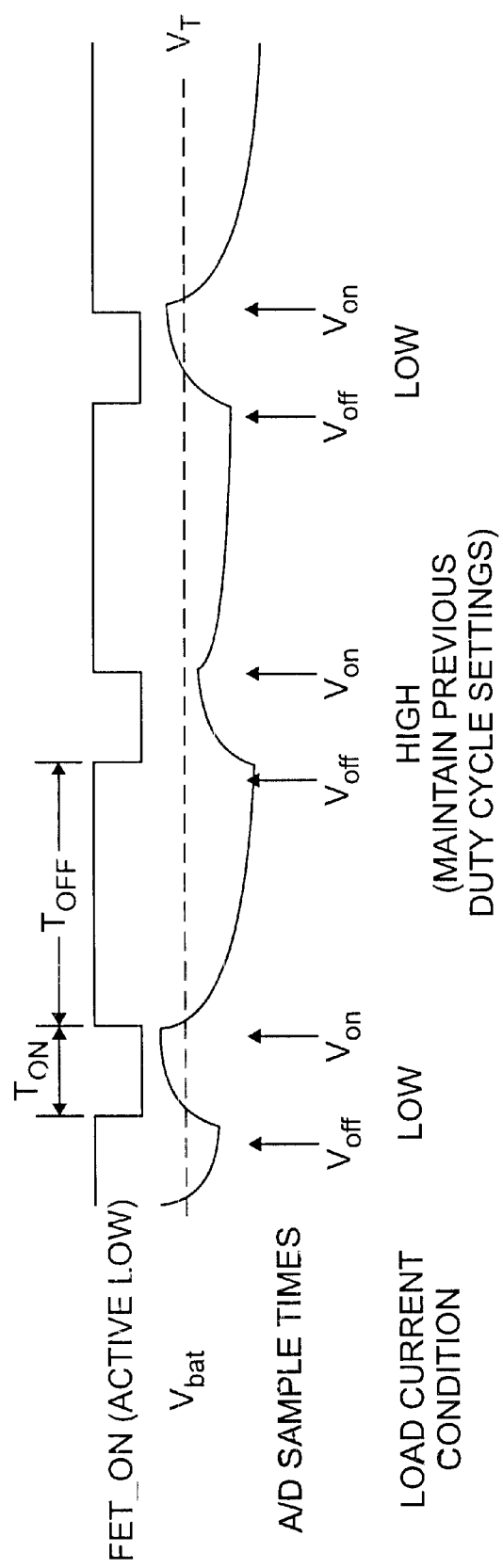
FIG. 4 illustrates the relative timing between periods when the charge current is on and off for the battery charging system of FIG. 3.

FIG. 4 illustrates the relative timing between periods when the charge current is on and off. The time during which the charge current is applied is referred to as $T_{ON}$, and the time during which the charge current is off is referred to as $T_{OFF}$. The total period of the charge pulse is $T_c$ ($T_{ON} + T_{OFF}$). It is noted that $T_C$ is not necessarily constant but can vary from one cycle to the next, depending on the state of the battery and the amount of load current being drawn from it. The current source 340 is always on and off for at least a corresponding defined minimum time.

During each charging cycle, an analog-to-digital converter 325 samples the battery voltage at the end of both the ON and OFF intervals. The sample obtained just before the current source 340 turns on (at the end of the off interval) is referred to as $V_{off}$, and the sample obtained just before the current source 340 turns off (at the end of the on interval) is referred to as $V_{on}$. After the sample that occurs at the end of the ON interval ($V_{on}$), a new duty cycle is calculated by the charger logic circuit 330 based on the following equations:

$$P_{on} = \text{Fraction of time charging current applied} = T_{on}/T_C;$$

$P_{off}$=Fraction of time charging current is off=$T_{off}/T_C$;
If $V_{on}$ is greater than $V_T$, then:
New $P_{off}=(V_T-V_{on})/(V_{on}-V_{off})$;
New $P_{off}=(V_{on}-V_T)/(V_{on}-V_{off})$;
If $V_{on}$ is less than $V_T$, then:
New $P_{on}$=Previous $P_{on}$;
New $P_{off}$=Previous $P_{off}$.

It is noted that the algorithm works just as well if the calculation is performed at the end of the OFF interval, as opposed to the ON interval. It is further noted that since the previous settings are maintained when $V_{on}$ is less than $V_T$, false readings are ignored.

As shown in FIG. 4, when the load current is low, the battery voltage, $V_{bat}$, will tend to exceed the desired voltage, $V_T$, during a given cycle. Thus, the first set of conditions ($V_{on}$ is greater than $V_T$) will be applied when determining the new duty cycle. When the load current is high, however, the battery voltage, $V_{bat}$, will tend to be below the desired voltage, $V_T$, during a given cycle (attributed to the equivalent series resistance (ESR) 320). Thus, the second set of conditions ($V_{on}$ is less than $V_T$) will be applied when determining the new duty cycle and thereby maintain the duty cycle of the previous cycle.

It is to be understood that the embodiments and variations shown and described herein are merely illustrative of the principles of this invention and that various modifications may be implemented by those skilled in the art without departing from the scope and spirit of the invention.

I claim:

1. A method for charging a rechargeable battery, comprising the steps of:
   applying a current source to said battery during an on interval;
   removing said current source from said battery during an off interval;
   measuring a voltage on said battery at the end of each of said on and off intervals; and
   determining a duty cycle for said current source for a subsequent cycle based on a difference between said measured battery voltage and a desired battery voltage.

2. The method of claim 1, wherein said determined duty cycle modulates a duration of said on and off intervals such that on average said measured battery voltage equals said desired battery voltage.

3. The method of claim 1, wherein said determining step further comprises the step of determining a fraction of time that said current source is applied to said battery by computing a ratio of a difference between said desired battery voltage and said measured voltage at the end of said on interval and a difference between said measured voltage at the end of said on and off intervals.

4. The method of claim 1, wherein said determining step further comprises the step of determining a fraction of time that said current source is applied to said battery by computing a ratio of a difference between said desired battery voltage and said measured voltage at the end of said off interval and a difference between said measured voltage at the end of said on and off intervals.

5. The method of claim 1, wherein said determining step further comprises the step of employing a previously determined duty cycle if said measured voltage at the end of said on interval is below said desired battery voltage.

6. The method of claim 1, wherein said determining step further comprises the step of employing a previously determined duty cycle if said measured voltage at the end of said off interval is below said desired battery voltage.

7. The method of claim 1, wherein said rechargeable battery is a lithium-ion battery.

8. The method of claim 1, wherein said rechargeable battery is a lithium-polymer battery.

9. The method of claim 1, further comprising the step of initially charging said battery in a constant current mode until said measured battery voltage reaches said desired battery voltage.

10. A battery charging system, comprising:
    a memory that stores computer-readable code; and
    a processor operatively coupled to said memory, said processor configured to implement said computer-readable code, said computer-readable code configured to:
    apply a current source to said battery during an on interval;
    remove said current source from said battery during an off interval;
    measure a voltage on said battery at the end of each of said on and off intervals;
    determine a duty cycle for said current source for a subsequent cycle based on a difference between said measured battery voltage and a desired battery voltage.

11. The battery charging system of claim 10, wherein said determined duty cycle modulates a duration of said on and off intervals such that on average said measured battery voltage equals said desired battery voltage.

12. The battery charging system of claim 10, wherein said processor is further configured to determine a fraction of time that said current source is applied to said battery by computing a ratio of a difference between said desired battery voltage and said measured voltage at the end of said on interval and a difference between said measured voltage at the end of said on and off intervals.

13. The battery charging system of claim 10, wherein said processor is further configured to determine a fraction of time that said current source is applied to said battery by computing a ratio of a difference between said desired battery voltage and said measured voltage at the end of said off interval and a difference between said measured voltage at the end of said on and off intervals.

14. The battery charging system of claim 10, wherein said processor is further configured to employ a previously determined duty cycle if said measured voltage at the end of said on interval is below said desired battery voltage.

15. A battery charging system, comprising:
   a current source that is selectively applied and removed from a battery during an on and off interval, respectively;
   an analog-to-digital converter to measure a voltage on said battery at the end of each of said on and off intervals; and
   a charger logic circuit to determine a duty cycle for said current source for a subsequent cycle based on a difference between said measured battery voltage and a desired battery voltage.

16. The battery charging system of claim 15, wherein said determined duty cycle modulates a duration of said on and off intervals such that on average said measured battery voltage equals said desired battery voltage.

17. The battery charging system of claim 15, wherein said charger logic circuit is further configured to determine a fraction of time that said current source is applied to said battery by computing a ratio of a difference between said desired battery voltage and said measured voltage at the end of said on interval and a difference between said measured voltage at the end of said on and off intervals.

18. The battery charging system of claim 15, wherein said charger logic circuit is further configured to employ a previously determined duty cycle if said measured voltage at the end of said on interval is below said desired battery voltage.

19. A battery charging system, comprising:
   means for selectively applying and removing a current source from a battery during an on and off interval, respectively;
   means for measuring a voltage on said battery at the end of each of said on and off intervals;
   means for determining a duty cycle for said current source for a subsequent cycle based on a difference between said measured battery voltage and a desired battery voltage.

20. The battery charging system of claim 19, wherein said determined duty cycle modulates a duration of said on and off intervals such that on average said measured battery voltage equals said desired battery voltage.

21. The battery charging system of claim 19, wherein said means for determining a duty cycle is further configured to determine a fraction of time that said current source is applied to said battery by computing a ratio of a difference between said desired battery voltage and said measured voltage at the end of said on interval and a difference between said measured voltage at the end of said on and off intervals.

22. The battery charging system of claim 19, wherein said means for determining a duty cycle is further configured to determine a fraction of time that said current source is applied to said battery by computing a ratio of a difference between said desired battery voltage and said measured voltage at the end of said off interval and a difference between said measured voltage at the end of said on and off intervals.

23. The battery charging system of claim 19, wherein said means for determining a duty cycle is further configured to employ a previously determined duty cycle if said measured voltage at the end of said on interval is below said desired battery voltage.

24. An integrated circuit, comprising:
   a current source that is selectively applied and removed from a battery during an on and off interval, respectively;
   an analog-to-digital converter to measure a voltage on said battery at the end of each of said on and off intervals; and
   a charger logic circuit to determine a duty cycle for said current source for a subsequent cycle based on a difference between said measured battery voltage and a desired battery voltage.

25. The integrated circuit of claim 24, wherein said determined duty cycle modulates a duration of said on and off intervals such that on average said measured battery voltage equals said desired battery voltage.

26. The integrated circuit of claim 24, wherein said charger logic circuit is further configured to determine a fraction of time that said current source is applied to said battery by computing a ratio of a difference between said desired battery voltage and said measured voltage at the end of said on interval and a difference between said measured voltage at the end of said on and off intervals.

27. The integrated circuit of claim 24, wherein said charger logic circuit is further configured to employ a previously determined duty cycle if said measured voltage at the end of said on interval is below said desired battery voltage.

* * * * *